INVENTORS
OTTO C. WINZEN
BY VERN E. BAUMGARTNER
JOHN T. BECK
Paul, Moore Lipper
ATTORNEYS

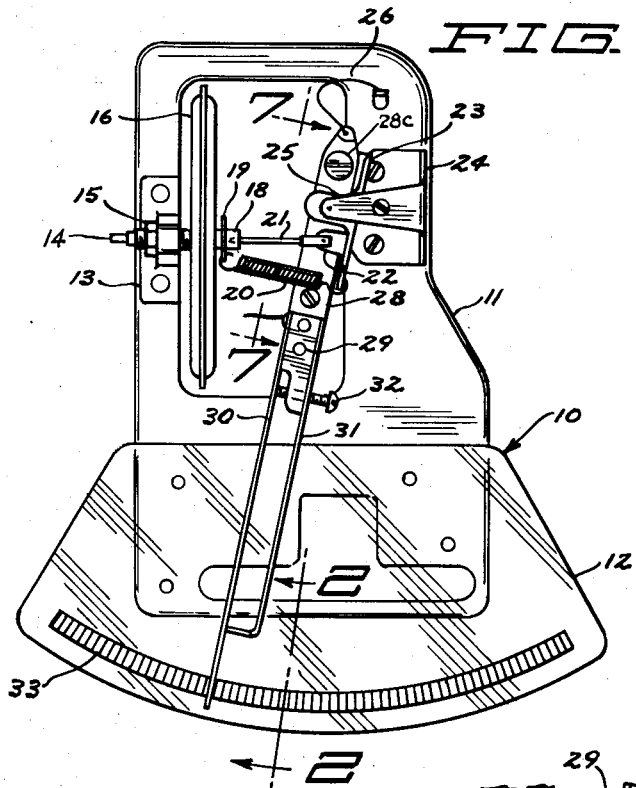
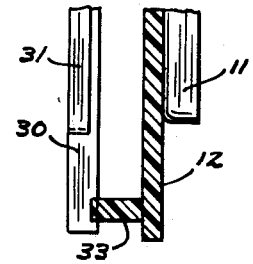
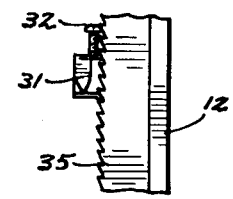
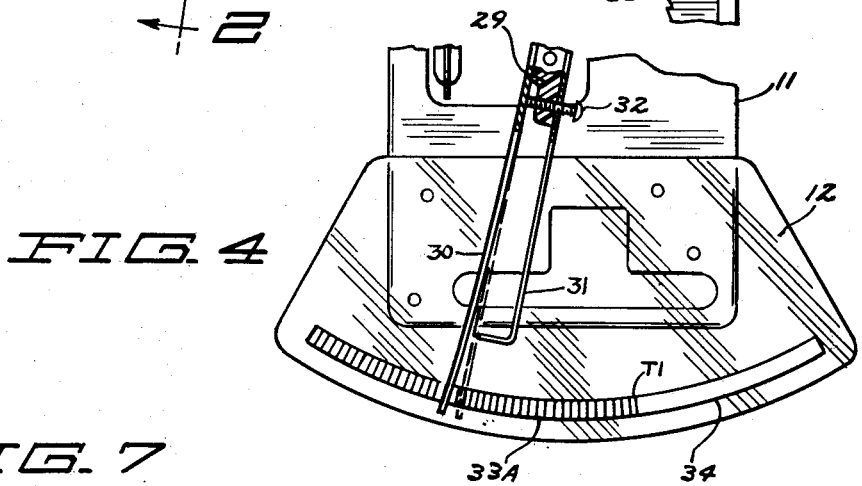
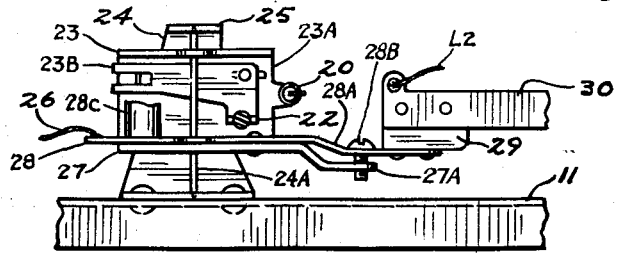
INVENTORS
OTTO C. WINZEN
BY VERN E. BAUMGARTNER
JOHN T. BECK
ATTORNEYS Aug. 18, 1959     O. C. WINZEN ET AL     2,900,149
ELECTROMAGNETICALLY CONTROLLED BALLAST DISPENSING MEANS
Filed May 4, 1955     3 Sheets-Sheet 2

INVENTORS
OTTO C. WINZEN
VERN E. BAUMGARTNER
BY JOHN T. BECK

ATTORNEYS

United States Patent Office 2,900,149
Patented Aug. 18, 1959

2,900,149

ELECTROMAGNETICALLY CONTROLLED BALLAST DISPENSING MEANS

Otto C. Winzen, Mendota Township, Dakota County, Verne E. Baumgartner, Minneapolis, and John T. Beck, White Bear Lake, Minn.; said Winzen and said Baumgartner assignors to Winzen Research, Inc., Minneapolis, Minn., a corporation of Minnesota Application May 4, 1955, Serial No. 506,048

9 Claims. (Cl. 244—94)

This invention relates to new and useful improvements in the baroswitches or switches of the pressure differential type, and particularly relates to new and useful inventions in self-arming pressure differential switches.

While the switches of this invention are particularly and specifically useful in the field of ballooning for automatically controlling the dropping of ballast from a balloon so that the balloon may be floated at maximum or predetermined altitudes, these switches are readily utilizable in various other applications, such as the control of electrical or mechanical circuits by change in pressure, in pressure alarms on the ground, in conjunction with pressurized rooms, in ballast or alarm controls for diving bells, bathospheres, etc., or in various pressure operated triggering devices, such as balloon alarms, "blow down" apparatus, balloon parachute release apparatus, etc.

In the art of ballooning it is desirable to provide some automatic means for controlling the altitude of a balloon, particularly on small balloons which are not capable of carrying operators. To this end, it has been attempted to control the altitude of balloons by either escape of gas, through an appendix or through the balloon envelope, or by dropping ballast. As will be appreciated, the control of altitude of balloons is particularly important in some modern day applications of the balloon art since the direction and speed of air movement is different at different altitudes, and if the altitude and direction and speed of the air movement is known balloons can be dropped, landed at or floated over a particular place which is not accessible by other means, such as in politically adversely controlled territories. Our switch has been found, as stated above, particularly useful in the control of ballast delivery from balloons for the maintenance of level floating altitude for extended periods.

While pressure differential switches of the self-arming type have been heretofore proposed, they have suffered from difficulties in that they have been complicated, expensive, heavy in weight, and extremely apt to fail because of extreme temperature changes, particularly those encountered in ballooning. Thus it has been proposed to use a "lead screw" pressure differential switch in which the switch is armed by a screw operating in combination with a follower, electrically operated. This has been particularly unsatisfactory because of motor failure and mechanical failure resulting from the voidance of fine tolerances because of temperature changes, etc.

It is therefore an object of our invention to provide a new and useful baroswitch of inexpensive construction, lightness in weight and efficiency of operation under extreme temperature ranges.

It is a further object of this invention to provide a self-arming pressure differential switch which is not readily susceptible to failure and is adaptable to a wide variety of uses.

It is still a further object of this invention to provide a self-arming pressure differential switch capable of automatically arming itself over a wide range of pressures.

It is a further object of this invention to provide in combination with a self-arming pressure differential switch, a ballast control mechanism for a balloon operable when the balloon has reached a predetermined or ceiling altitude.

Still a further object of this invention is the provision of an automatic ballast control mechanism in cooperation with a self-arming pressure differential switch for controlling the altitude of a balloon, such automatic ballast control including an electro-magnetic circuit for controlling dropping of ballast.

Further objects of the invention reside in the specific details of the baroswitch including a partially or entirely toothed rack and in the contact means and other structural features of the switch.

Still other and further objects of the invention reside in the specific and structural details of the ballast control in cooperation with the switch.

Still other and further objects of the invention are apparent and inherent in the apparatus as described, illustrated and claimed.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention will be described with reference to the drawings in which corresponding numerals refer to the same parts and in which:

Figure 1 is a top plan view of our switch;

Figure 2 is a fragmentary vertical sectional view taken along the line and in the direction of the arrows 2—2 of Figure 1;

Figure 3 is a fragmentary end elevational view, rotated 90 degrees, of a modified form of toothed rack of our invention;

Figure 4 is a fragmentary top plan view, similar to Figure 1, but showing a second modification of the rack of Figure 1;

Figure 7 is a vertical sectional view along the line and in the direction of the arrows 7—7 of Figure 1;

Figure 5:
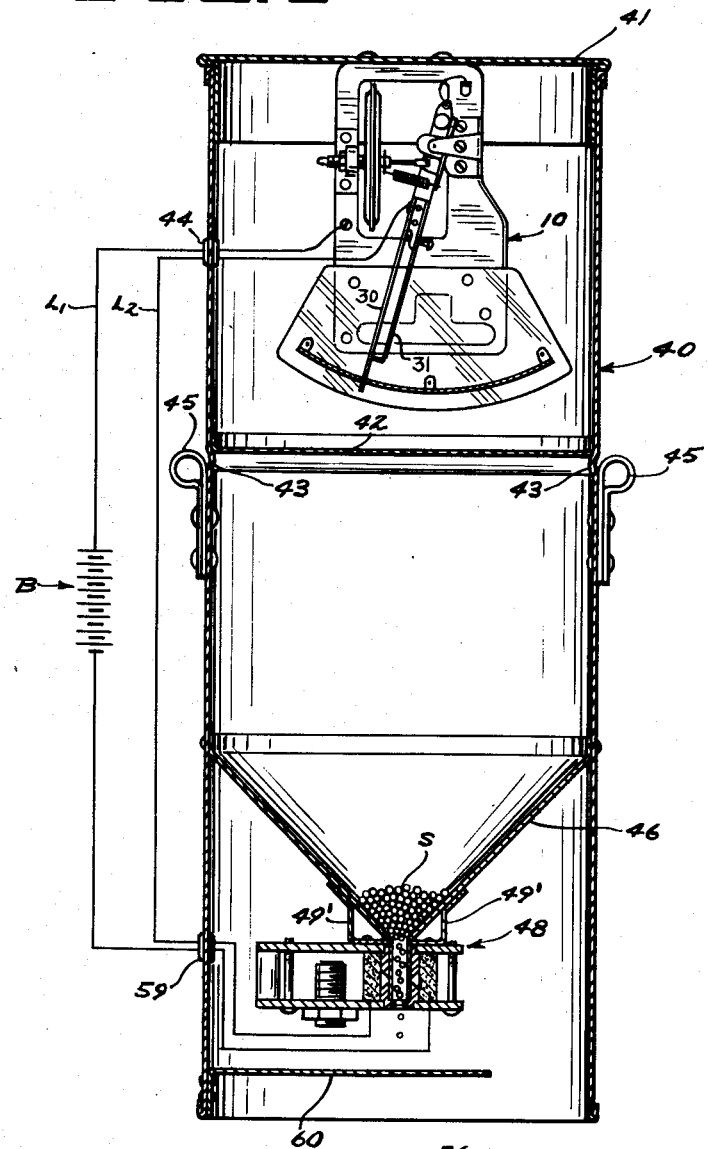
Figure 5 is a vertical sectional view of one form of the automatic ballast control of our invention incorporating our pressure differential switch therein.

By reference to the drawings and particularly to Figures 1–4 and 7, it will be seen that our baroswitch or pressure differential switch, generally designated 10, comprises a frame 11, and an actuator rack support 12.

The frame 11 is usually stamped from some lightweight material such as aluminum, but may be fabricated in any conventional manner.

Positioned on the frame 11 is a pillow block 13 in which is threaded an adjusting screw 14 provided with a lock nut 15. A bellows 16 comprising two cooperating disk wafers sealed to atmosphere and joined throughout a median flange is secured to the interior end of screw 14 by one face. Secured to the opposite face of the bellows 16 is a cup 18 having a peripheral recess for receiving a conventional snap key 19 securing one end of a spring 20 thereto.

The cup 18 is provided with a central recess at its distal end which receives the pointed end of a pin 21. The opposite end of the pin 21 is provided with a clevis which is pivotally attached to a lug 22 upon pivoted frame 23. Pivoted frame 23 is usually composed of a channel member 23A and an adjustable supporting frame 23B carrying lug 22 as shown in Figure 7, frame 23B being adjustable to left and right on member 23A with reference to Figure 7 for positioning pin 21 with reference to member 23A to vary the mechanical advantage of the connection. Channel member 23B of pivoted frame 23 is pivoted to a U-shaped support 24 by pin 24A supported in a top arm 25 and a bottom arm 27 connected to frame 11. Arm 27 is provided with an offset portion 27A as shown in Figure 7.

Secured to arm 27 and having a portion 28A spaced from offset 27A is an extending flexible block support 28 to which is riveted or otherwise secured an insulating block 29. Block support 28 overlies and is secured to arm 27 and is grounded to frame 11 by a flexible electrical connector 26. The spacing of portion 28A with respect to offset 27A is determined by a screw 28B which in turn determines the riding tension of arm 30 on rack 33 as later explained. A counterweight 28C serves to balance the weight of arm 30 and 31 about pivot 24A.

Secured to one side of block 29 is a first contact arm 30. Secured to the other side of insulator block 29 is a second contact arm 31 having a bent pointer end adapted to engage the flat surface of arm 30. An adjustment screw 32 is threaded into block 29 through an enlarged aperture in arm 31 and is thus insulated therefrom. In use, screw 32 may be adjusted, as is best apparent from Figure 4 to provide a slight clearance between the point of arm 31 and arm 30. Alternatively, the point of arm 31 may rest on arm 30 with slight pressure and the drag by the teeth of the rack 33 on arm 30 be permitted to separate the arms during operation as shown in Figure 4. The former adjustment is preferred however.

Riveted to frame 11, or secured by other suitable means, is the fan-shaped actuator rack support 12 of insulating material.

Supported thereby, as is shown in Figure 1, is an arcuate rack 33. This rack is provided with saw teeth (inclined from left to right in that figure) so that the arm 30 may advance freely in a direction from left to right but may not retreat from right to left.

As shown in Figure 2 the commutator rack 33 is in this instance made of "Lucite," as is the support 12. However, if desired, as shown in Figure 3, the commutator rack may be made of metal or any other suitable material. Some material having a low coefficient of friction, such as "Lucite," is to be preferred.

As shown in Figure 4, if desired, a modified commutator rack 33A may be used in which teeth are provided throughout only a segment thereof and a smooth surface 34 is provided throughout the remainder of the rack.

By reference now to Figure 3, it will be seen that the arm 30 is provided with a slight incline or bend along the edge when it engages the teeth 35 of rack 33. This facilitates the movement of the arm 30 in an upward direction (from left to right with reference to Figure 1) and causes the arm 30 to securely engage the teeth 35 if the arm is moved in the reverse direction. Thus, the arm is normally set to move in a leading direction (in this instance from left to right with reference to Figure 1) and the bend or decline is provided in the trailing direction.

It has been found in actual practice that the arms 30 and 31 operate much more efficiently if they are each made of a conductor having a low coefficient of expansion and thus expand and contract little with temperature. For this purpose we have found that silver plated bronze or beryllium is extremely satisfactory.

Referring now to Figure 5 there is shown the switch 10 supported within a ballast container 40. Container 40 is circular in cross section and is provided with a cooperating lid 41 adapted for friction seating in one end thereof as shown in Figure 5. The switch 10 is secured to the lid 41 by rivets or other suitable means. A tray 42 is supported by a rolled bead 43 and compartmentalizes the container 40 to provide a separate compartment for the switch 10 within the container. The container is apertured to provide an opening at 44 through which electrical conductors L1 and L2 may pass. The aperture 44 is usually insulated with a rubber grommet.

A pair of eyes 45 are positioned on the exterior of the container 40 and are used to support the container from the balloon with which it is to be used; cords or other means being secured to the balloon and then in turn secured to eyes 45. Positioned some distance below tray 42 is a conical funnel 46. Shot shown by the letter S is normal positioned in the compartment formed by the tray 42 and funnel 46, and adapted to flow downwardly through the funnel as shown in Figure 5.

Secured to the underside of funnel 46 is a conventional magnetic valve 48 supported by a pair of brackets 49' therefrom. Valve 48 comprises a pair of plates 49 and 50 separated by a permanent magnet 51, and a core 52, of an electro-magnet. The plates are joined together by a plurality of screws 53. The electro-magnet is provided with a top pole 54 and a bottom pole 55. A brass pole insert 56 is positioned at the center of the poles 54 and 55 and is hollow for the flow of shot therethrough. A shunting screw 58 is provided for controlling the flux density in the magnetic valve.

Leads L1 and L2 are connected to the core 52 of the electro-magnet 52, 54, 56 and emerge from the container 40 through an aperture 59 provided with a rubber grommet for insulation.

A battery B is connected in series to the circuit formed by leads L1 and L2, switch 10, and electro-magnet 52, 54, 55 in any suitable manner, as is schematically shown in Figure 5. It is to be understood that the battery may be placed within the compartment formed by tray 42 and cap 41 or elsewhere as suitable.

The bottom of the container 40 is open, but may be provided with a baffle 60 if desired.

In use the switch 10 is usually preliminarily adjusted so that there is a slight gap or clearance between the inturned end of arm 31 and the surface of arm 30 when no force is exerted by either spring 20 or bellows 16. The use of a slight gap or the amount of the gap is to a certain extent dependent on the coefficient of friction of the material of which rack 33 is made. The gap is controlled by the adjustment of screw 32 which separates the arms 30 and 31 against their natural resiliency.

The arm 30 in its engagement with toothed rack 33 is usually positioned substantially adjacent the beginning or leftward edge of the rack with reference to Figure 1. This is accomplished by loosening the lock nut 15 and adjusting the screw 14 carrying bellows 16 leftwardly with reference to Figure 1 until the bellows 16 allow pin 21 to move leftwardly so as to allow arm 30 to be positioned adjacent the leftward end of toothed rack 33. The lock nut 15 is then tightened.

It may be noted that spring 20 is connected to cup 18 and therefore movable as the bellows 16 expands and contracts due to the external pressure. Thus, it serves merely to bias frame 23 pivotally around pin 24A to urge pin 21 into contact with cup 18, and arm 30 toward the leftward edge of rack 33 with a constant bias. It will extend after the edge of arm 30 engages a tooth and the arm 30 will then remain stationary.

The frame 23B may be adjusted leftwardly or rightwardly with reference to Figure 7, with respect to frame 23A so as to provide the desired mechanical advantage or multiplication of the movement of cup 18 as evidenced in the movement of arms 30 and 31. Likewise, by adjustment of screw 28B, the tension with which arm 30 will ride over the teeth of rack 33 is adjusted.

A decrease in external pressure on bellows 16 will cause the internal pressure of the bellows to move the pin 21 rightwardly with respect to Figures 1 and 4, thus pivoting the arms 30 and 31 about pin 24A and causing arm 30 to be bent to the position of Figure 4. As the external pressure keeps decreasing on bellows 16 the arms 30 and 31 will remain in the position of Figure 4 and the arms will continue advancing from left to right with reference to Figure 1. Upon an increase of external pressure on bellows 16 the arms 30 and 31 with respect to each other will assume the position of Figure 1. The pressure of bellows 16 on pin 21 will be released and action of spring 20 brings arm 31 into contact with arm 30 to complete the circuit through the switch. To state this another way, there is provided a self-arming pressure differential switch which, as the arms 30 and 31 remain spaced, activates no circuit. The switch is armed by the advancement of arm 30 over each successive tooth. When arm 30 has reached each successive tooth a further decrease in pressure will cause arms 30 and 31 to remain spread and arm 30 to continue in advance of the next tooth. However, if the external pressure at that point increases, the bellows 16 will be contracted and spring 20 will pull block 29 leftwardly, and since arm 30 is engaged by a tooth 35, arm 31 will be pulled into engagement with arm 30 as the cup 18 retracts due to the contraction of bellows 16 to energize the circuit as shown in Figure 1. As long as the pressure remains at the increased level the circuit will be energized and if the pressure again decreases the circuit will be broken. Further increase in pressure will cause spring 20 to extend further and arm 30 to remain in engagement with the last tooth reached.

With reference to Figure 4, it will be seen that a partially toothed rack may be provided. With such a rack, once a minimum pressure has been encountered and the arm 30 has moved over to the smooth surface 34 of the rack, a slight fluctuation in pressure will not close the arms 30 and 31 even though the external pressure varies as long as the minimum datum pressure is maintained. In this situation, the arms would be normally set with a slight gap therebetween. Once the minimum state of pressure is exceeded, however, the arm 30 will engage the foremost contact tooth T1 and move to contact position to energize a circuit.

It is of course to be understood that a toothed rack may also be provided in which gaps are positioned intermediate groups of teeth for some specific purposes. Likewise, while our switch has been explained as being operative to energize a circuit upon an increase in pressure above a datum or minimum pressure, it is to be understood that the teeth of the rack 33 may be reversed or the position of the bellows with respect to arms 30 and 31 reversed so that the switch will be operative upon a decrease in pressure below a datum or maximum pressure.

Figure 8:
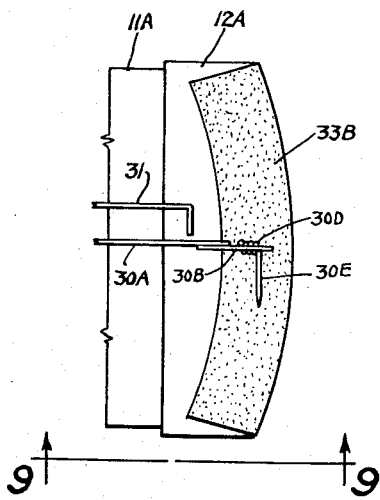
Figure 8 is a fragmentary plan view showing a third modified form of the invention.
Figure 9:
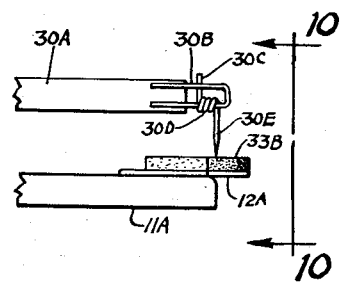
Figure 9 is a view taken along the line and in the direction of the arrows 9—9 of Figure 8.
Figure 10:
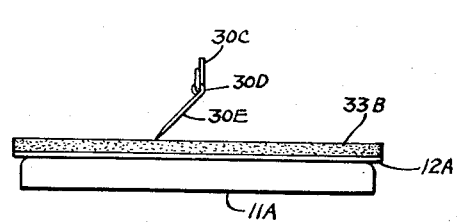
Figure 10 is a view taken along the line and in the direction of the arrows 10—10 of Figure 9.

In the modification shown in Figures 8–10, the frame 11A, similar to frame 11 of Figures 1–7 is joined to an actuator rack support 12A on which is supported a friction surface actuator rack 33B usually of felt or rubber. In this instance the edge arm 30 itself does not ride on rack 33B but is provided with a fixed loop support end 30B appended to the end thereof as shown in Figures 8 and 9. End loop 30B supports on its lower arm a pin having an end 30C engaging the upper arm of loop 30B, a middle portion 30D coiled around the lower arm of loop 30B and a pointed and rearwardly inclined end 30E (see Figure 10) which engages friction surface 33B. This modification operates the same as that shown in Figures 1–3 except that an infinite number of "teeth" is provided by the engagement of friction surface 33B with end 30E. The method of mounting the member 30C on loop 30B insures that end 30E will not become too firmly embedded in surface 33B and allows slight rearward (leftward with reference to Figure 10) movement of arm 30A before contact is established so that a slight fluctuation in pressure on bellows 16 will not effect the contact and energize the circuit.

Figure 6:
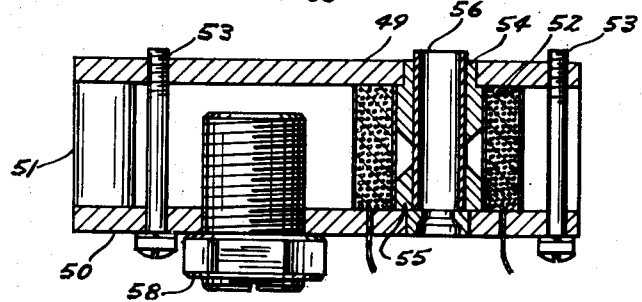
Figure 6 is an enlarged vertical sectional view of the electro-magnetic means for controlling the flow of ballast from the control.

In the operation of the switch to control the flow of ballast from a balloon as shown in Figures 5 and 6, the ballast control is first anchored to the balloon for flying therewith. The balloon is inflated and the switch adjusted so that arm 30 is provided with substantially the length of the rack 33 for travel. Line L1 is grounded to the frame of the switch 10 and connected to the core 52 of the electromagnet as shown. Line L2 is connected to the contact tab on arm 30 as shown in Figures 5 and 7 and also connected to the electro-magnet coil 55. The plates 49 and 50 joined to the magnet 51 serve as permanent magnets to freeze shot S as it flows through the aperture in insert 56. Upon energization of the circuit by an increase in pressure after the switch 10 has been successively armed by continual decreases in pressure it will energize the electro-magnet 51 to neutralize the magnetic attraction of the permanent magnet 51 and the ballast shot S will drop through member 56 as shown in Figure 5. If the balloon successively arises to a higher altitude, on lesser external pressure, the contacts 30 and 31 will again separate, the circuit to the electro-magnet will be de-energized and ballast shot will once more become immobilized by the permanent magnet 51 and plates 49 and 50.

As many widely differing embodiments of this invention may be made without departing from the spirit and scope thereof, it is to be understood that we do not specifically limit ourselves to the illustrative embodiment disclosed herein.

What we claim is:
1. A ballast control mechanism comprising in combination a container adapted to be suspended from a balloon and having means for retaining comminuted ballast therein, a magnetic valve normally operative to retain said ballast in said container, said magnetic valve operative when energized to release said ballast therefrom, an electric circuit connected to said valve and a pressure differential switch for energizing said circuit, said pressure differential switch including means for sequent conditioning of said circuit as external pressure is changed in one direction only, and means for energizing said circuit only as said pressure is changed in the other direction, and said means for sequent conditioning of said circuit including an elongated member and a wiper arm adapted to travel in one direction thereover.

2. A ballast control mechanism comprising in combination a container for supporting comminuted magnetic ballast, a magnetic valve including a permanent magnet and an electro-magnet, said permanent magnet normally serving to retain said ballast in said container and said electro-magnet, when operative, serving to neutralize said permanent magnet for permitting the emission of ballast from said container, an electric circuit for energizing said electro-magnet, and a pressure differential switch for energizing said electric circuit, said pressure differential switch including means responsive to a change in external pressure in one direction for conditioning said circuit for energization and means responsive to a change in external pressure in the other direction for energizing said circuit, said means including an extended rack engaged by a resilient contact member and a second contact member adapted to engage said first member when said first member is biased in one direction on said rack.

3. The subcombination of an elongated member providing a friction surface, an extending member having means engaging said friction surface, pressure responsive means adapted to move said extending member in one direction over said surface in response to external fluid pressure, bias means adapted to urge said member in an opposite direction with respect to the movement occasioned by said pressure responsive means and against the force exerted by said pressure responsive means, and a second extending member actuated when force is removed from said first extending member by said pressure responsive means to engage said first member for the completion of a circuit, and frame means supporting all of said foregoing means.

4. The subcombination of a friction surface, a flexible extending member having an edge engaging said surface, pressure responsive means adapted to forcibly move said extending member in one direction along said surface in response to external atmospheric pressure, bias means tending to urge said member in an opposite direction with respect to said surface, and a second extending member actuated when force is removed from said first extending member by said pressure responsive means to engage said first member for the completion of a circuit.

5. A pressure differential switch comprising in combination a friction surface, an extending member having an edge engaging said friction surface, means responsive to changes in external pressure adapted to move said extending member in one direction over said surface as said external pressure is decreased, means tending to urge said member in an opposite direction in respect to said surface, and a second extending member actuated when pressure is increased on said pressure responsive means to engage said first member for the completion of a circuit.

6. A ballast control mechanism comprising in combination containing means for retaining a supply of dischargeable ballast, means normally operative to retain said ballast therein but operable to discharge ballast from the container, an electric circuit connected to said last means and a pressure differential switch for energizing said circuit, said pressure differential switch including an elongated member providing a friction surface, an extending member having means engaging said friction surface, pressure response means adapted to move said extending member in one direction over said surface in response to external fluid pressure, bias means adapted to urge said member in an opposite direction with respect to the movement occasioned by said pressure responsive means and against the force exerted by said pressure responsive means, and a second extending member adapted to engage said first member for the completion of a circuit when force is removed from said first extending member by said pressure responsive means.

7. The apparatus of claim 6 further characterized in that said elongated member comprises a serrated rack.

8. The apparatus of claim 6 further characterized in that said elongated member comprises a friction surface portion and a smooth portion.

9. The subcombination of a frame, an elongated member secured to said frame and providing a friction surface, an extending member pivotally secured to said frame and extending over said surface, said extending member having means for engaging said friction surface, pressure responsive means secured to said frame in spaced relation to said extending member and adapted to move said member over said surface in one direction in response to external fluid pressure, bias means secured to said pressure responsive means and to said elongated member and adapted to urge said member in a direction counter to said one direction, a second extending member adapted to engage said first member for the completion of a circuit when force is removed from said first extending member by said pressure responsive means.

References Cited in the file of this patent

UNITED STATES PATENTS

| | | |
|---|---|---|
| 2,315,137 | Shaw | Mar. 30, 1943 |
| 2,340,718 | Wallace | Feb. 1, 1944 |
| 2,367,034 | McCabe | Jan. 9, 1945 |
| 2,437,473 | Ogden et al. | Mar. 9, 1948 |
| 2,486,742 | Gebhardt | Nov. 1, 1949 |
| 2,738,392 | Talbott | Mar. 13, 1956 |
| 2,742,246 | Mellen | Apr. 17, 1956 |